Nov. 12, 1968

D. I. FALES ET AL 3,410,362

SPEED CONTROL SYSTEM

Filed May 9, 1966

INVENTORS
Douglas I. Fales,
Ronald L. Colling &
Jack H. Perry
Albert F. Duke
ATTORNEY

United States Patent Office 3,410,362
Patented Nov. 12, 1968

3,410,362
SPEED CONTROL SYSTEM
Douglas I. Fales, Flint, Ronald L. Colling, Davison, and Jack H. Perry, Fenton, Mich., assignors to General Motors Corporation, Detroit, Mich., a corporation of Delaware
Filed May 9, 1966, Ser. No. 548,716
2 Claims. (Cl. 180—110)

ABSTRACT OF THE DISCLOSURE

A speed control system having a photoelectric speed transducer which develops, over a predetermined speed range, a D-C error signal representing the difference between actual vehicle speed and a desired vehicle speed. The error signal controls a multivibrator which develops a pulsating output signal having a pulse duration proportional to the error signal. The pulsating output signal drives a servomotor which in turns controls the vehicle throttle to maintain the actual vehicle speed at the desired vehicle speed.

---

This invention relates to control mechanisms and more particularly to a speed control system for maintaining a motor vehicle at a predetermined road speed under varying load conditions.

In general the prior art cruise control systems have employed a speed transducer or error detector responsive to actual vehicle speed and a desired vehicle speed to provide an error signal which is utilized to control the engine of the vehicle in such a manner as to reduce the error signal to zero and to maintain it as close to zero as possible.

The speed transducer employed in these prior art control systems has taken different forms. Since one input to the speed transducer is actual vehicle speed, it has been proposed that the speed transducer be located so as to take advantage of the actual speed input to the vehicle speedometer. It is desirable in such arrangements that the speed transducer not interfere with the speedometer mechanism and impart as little drag or other resistance to the speedometer operation as possible. Because of the importance of this latter consideration, photoelectric speed transducers offer distinct advantages and have been suggested in the past.

A primary disadvantage of cruise control systems in the prior art which utilize photoelectric speed transducers is the highly unstable operation of the system. This unstable operation results from feeding essentially a full throttle or idle throttle signal to the speed control mechanism.

The disadvantages of the prior art are obviated by the present invention wherein a speed control system is provided which includes a photoelectric speed transducer which develops a variable D-C signal over a range of speed above and below a desired cruising speed. The variable D-C signal is fed to a multivibrator which develops a constant output signal when the actual vehicle speed is below the aforementioned speed range, zero output signal when the actual vehicle speed is above the aforementioned speed range and develops a pulsating output signal of substantially constant frequency and variable pulse width or duration when the vehicle speed is within said speed range. The output of the multivibrator drives the engine speed control mechanisms to provide a highly stable system.

A more complete understanding of the present invention may be had from the following detailed description which should be read in conjuction with the drawing in which.

Figure 1:
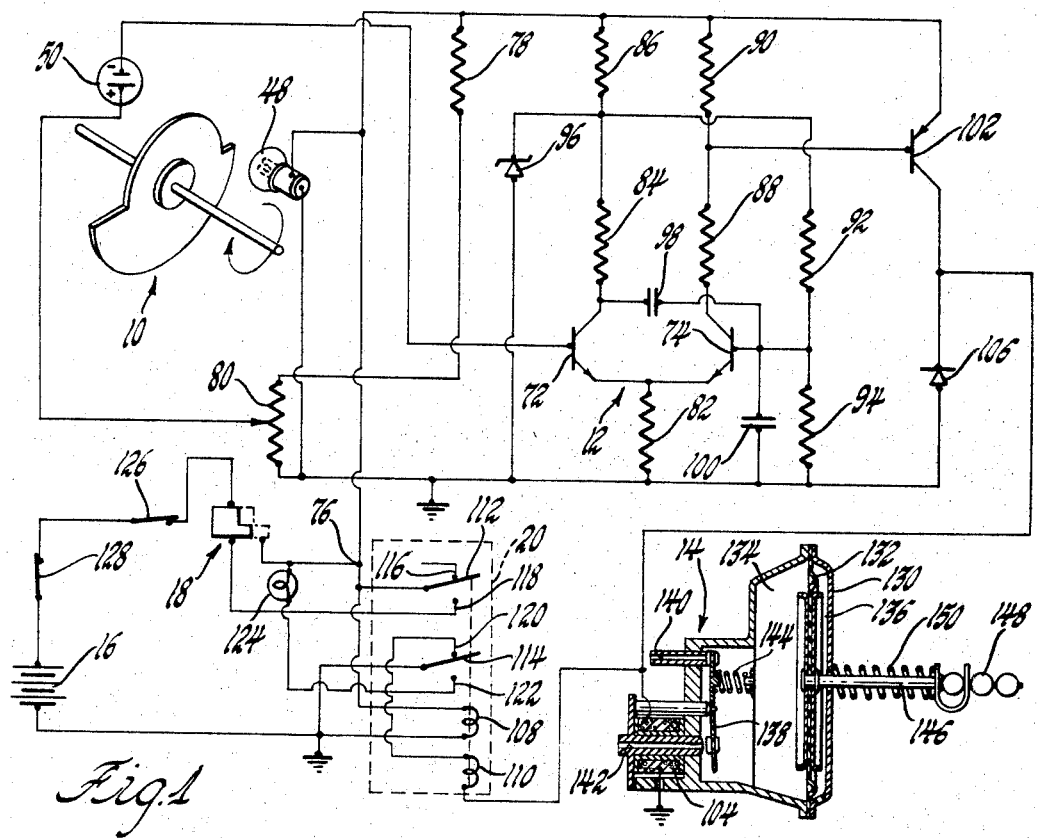
FIGURE 1 is a schematic diagram of the speed control system and includes a sectional view of the fluid pressure servomotor utilized in the system.

Referring now to the drawing and initially to FIGURE 1, the speed control system of the present invention comprises a speed transducer generally designated 10 which feeds a speed error signal to a multivibrator generally designated 12 which develops an output signal for driving a fluid pressure servomotor generally designed 14. A source of energy 16 which may be the vehicle battery is connected to the speed transducer 10, the multivibrator 12, and the servo motor 14 through a momentary engaged switch 18. A differential relay 20 provides a holding circuit under conditions which we more fully explain hereinafter.

Figure 2:
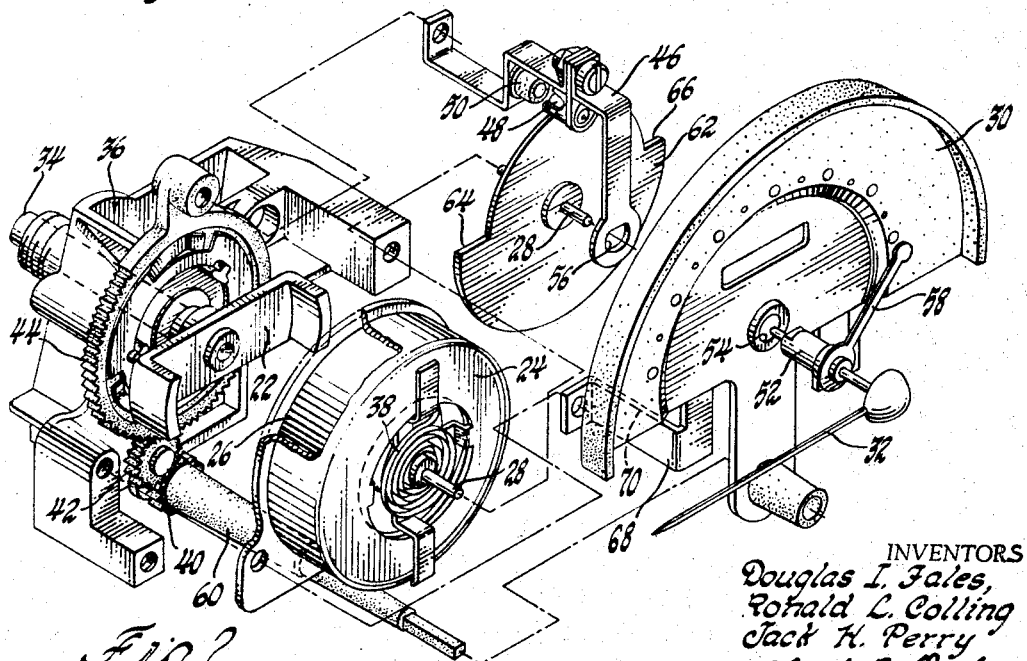
FIGURE 2 is an exploded view of the speed transducer utilized in the system.

The speed transducer 10 is depicted as integral with the vehicle speedometer in FIGURE 2. The speedometer may be of the type disclosed in U.S. Patent 2,798,174 granted July 7, 1957, in the name of Ralph O. Helgeby and includes the usual permanent magnet element 22, a field plate 24 and a speed cup 26. A spindle 28 affixed to the speed cup 26 protrudes through a dial 30 and is fitted with a pointer 32. It will be understood that the speedometer drive cable (not shown) is such as to drive a shaft 34 rotatably mounted in a support member 36 to thereby rotate the magnet 22 and thus induce a clockwise rotation of the spindle 28 to a position indicative of vehicle speed. The rotation of the speed cup 26 and spindle 28 is against the action of a spring 38 which tends to return the pointer 32 to the zero position. The support member 36 rotatably supports three meshing gears 40, 42 and 44. The gear 44 supports a generally U-shaped bracket or carrier 46 which in turn supports a light source 48 and a photocell 50. The spindle 28 is piloted in a bushing 52 which is piloted in an opening 54 in the dial 30 and registers with a D-shaped opening 56 in the carrier 46. A pointer 58 is staked to the bushing 52. The gear 40 is provided with an extension 60 having a square end portion for reception of a suitable knob (not shown) which permits the driver to manually set a desired cruise speed. Rotation of the gear 40 rotates the gears 42 and 44 to position the light source 48 and the photocell 50 at a desired angular location or speed which is indicated by the pointer 58.

A scanning disc 62 is secured to the spindle 28 for rotating therewith and is located in the speedometer between the field plate 24 and the dial 30 and passes between the light source 48 and the photocell 50. The disc 62 is provided with a cut-out section having edges 64 and 66. The disc 62 is initially located on the spindle 28 so that the edge 64 moves with the pointer 32. The dial 30 is secured to the support member 36 by a flange 68 which provides a stop 70 for the carrier 46. Another stop (not shown) limits movement of the carrier 46 in a clockwise direction. For example, the movement of the carrier may be limited to within the 30 to 90 mile per hour range of the dial 30.

Referring again to FIGURE 1, the ultivibrator 12 comprises a pair of transistors 72 and 74 and produces a substantially constant frequency variable duty cycle output signal. The battery 16 applies battery voltage to a junction 76 when the switch 18 is in the closed position. A resistor 78 and a potentiometer 80 are connected between the junction 76 and ground. The photocell 50 which is preferably of the photovoltaic type is connected between the base of transistor 72 and the tap on the potentiometer 80. The emitters of transistors 72 and 74 are coupled together and connected through a resistor 82 to ground while the collectors of transistors 72 and 74 are connected through resistors 84, 86, 88, 90 respectively to the junction 76. Voltage dividing resistors 92 and 94 are connected between the junction of resistors 84 and 86 and ground. The voltage across resistors 92 and 94 is maintained substantially constant by zener diode 96. The base of transistor 74 is connected to the collector of transistor 72 through a capacitor 98, to ground through a capacitor 100 and to the junction of the resistors 92 and 94. The junction between the resistors 88 and 90 is connected to the base of a transistor amplifier 102 which has its emitter connected to the junction 76 and the collector connected to a solenoid coil 104 of the servo motor 14. A diode 106 is connected across the coil 104 for spike suppression.

The differential relay 20 includes a holding coil 108 and an inhibiting coil 110, armatures 112 and 114 and contacts 116, 118, 120 and 122. The holding coil 108 is connected between the junction 76 and ground and the inhibiting coil 110 is connected to the junction 76 through the emitter collector path of the transistor 102 and to ground through the contact 120 and armature 114. As long as both coils 108 and 110 are energized, the armature 112 and 114 remain in the position shown. Deenergization of the coil 110 allows the armatures 112 and 114 to be transferred to a position in engagement with contacts 118 and 122 respectively. A cruise indicating lamp 124 is connected between the junction 776 and ground through the normally open contact 122. A switch 126 associated with the brake pedal and an ignition switch 128 are connected in series between the source 16 and the switch 18.

The servo motor 14 includes a two-part housing 130 supporting a diaphragm 132 thereby forming two chambers 134 and 136. The chamber 136 is open to atmosphere and the pressure in the chamber 134 is modulated by operation of the solenoid coil 104 which operates a valve armature 138. The chamber 134 includes a vacuum supply port 140 and a port 142 communicating with the atmosphere. The armature 138 is normally biased to close the vacuum supply port 140 by means of a spring 144. The diaphragm 132 is connected to the vehicle throttle (not shown) through a rod 146, a bead chain 148 and is biased in a throttle closing direction by a spring 150. When the solenoid coil 104 is energized, the valve armature 138 is pulled in against the spring 144 closing the atmosphere port 142 and opening the vacuum port 140 to the chamber 134. Increasing vacuum admitted to the chamber 134 moves the diaphragm 132 in a throttle opening direction increasing the speed of the engine.

*Operation*

When it is desired to place the vehicle in a cruise mode of operation, the driver manually positions the carrier 46 through rotation of the gears 40, 42 and 44 to a desired cruising speed as indicated by the pointer 58. Closure of the switch 18 connects the battery 16 to the light source 48 and the mutlivibrator 12. The base bias on the transistor 74 is at a level such that the transistor 74 is conducting but not in saturation. If the actual vehicle speed is well below the desired crusing speed, the light source 48 will illuminate the photocell 50 through the cut away part of the disc 62 providing maximum output from the photocell 50. Current flow through the transistor 74 establishes a reference voltage at the emitter of transistor 72 and forward biases the transistor 102 energizing the solenoid coil 104 and the inhibiting coil 110 of the differential relay 20. The holding coil 108 is also energized so that the armatures 112 and 114 remain in the position shown. With the photocell 50 fully illuminated, the voltage established at the base of transistor 72 maintains the transistor 72 in a cut off condition. As the actual speed of the vehicle increases, either though control by the operator or automatically as a result of the energization of the solenoid coil 104, the disc 62 rotates in a clockwise direction. At 2 or 3 miles per hour below the desired crusing speed, the leading edge 64 of the disc 62 will begin to cut off part of the light falling on the photocell 50. This raises the voltage at the base of transistor 72 causing it to conduct. The voltage at the collector of transistor 72 drops, feeding a negative spike through the capacitor 98 to the base of transistor 74 tending to turn transistor 74 off and to increase conduction in the transistor 72. The positive feedback causes the multivibrator 12 to switch. With the transistor 74 cut off, the transistor 102 is also cut off, deenergizing the inhibiting coil 110 and causing the armatures 112 and 114 to engage contacts 118 and 122 respectively. The switch 18 may now be released with battery voltage being maintained at the junction 76 through the contact 118 and the armature 112. The lamp 124 is energized through the contact 122 and the armature 114 to indicate to the driver that the system is in a cruise condition.

The current through transistor 72 which is a function of the voltage applied to the base establishes some new voltage across the resistor 82. The voltage at the base of transistor 74 drops below its normal level and then decays upward toward its normal level through the time constant established by capacitor 98 and resistors 84, 92 and 94. When the base voltage of transistor 74 has risen sufficiently above the voltage established across the resistor 82, transistor 74 starts conducting again. This raises the voltage across resistor 82 which tends to turn transistor 72 off. When transistor 72 turns off, a positive spike is fed to the base of transistor 74 through the capacitor 98. This drives the transistor 74 further towards saturation and thus switches the multivibrator back to its initial state. As the base voltage of transistor 74 decays toward its normal value through the time constant network, the voltage across the resistor 82 also decays toward its normal value. However, when the voltage across the resistor 82 drops below the voltage at the base of transistor 72, transistor 72 starts conducting. As the input voltage at the base of transistor 72 is increased in a positive direction, the transistor 72 conducts for a longer period of time. At some upper limit input to transistor 72, the voltage across the resistor 82 will be high enough so that transistor 74 will not be able to turn back on. Likewise, at some lower limit, the transistor 72 will not be able to turn on. Between these upper and lower limits, the multivibrator is free running. The resistors 78 and 80 are used to bias the positive side of the photocell 50 above the upper limit required by the multivibrator to keep transistor 74 off all the time. With the photocell fully illuminated, a maximum output is obtained and the voltage supplied to the multivibrator is less than the lower limit required to turn transistor 72 on. As the leading edge 64 of the disc 62 begins to cut off part of the light falling on the photocell 50, the output voltage of the photocell 50 is reduced which raises the voltage at the base of transistor 72 toward the voltage established by the resistors 78 and 80 when the photocell 50 is completely covered, the photocell output will be zero and the multivibrator input will be the voltage established by the resistors 78 and 80. Thus an essentially square wave output signal having a duty cycle which varies between 0% and 100% over a narrow speed range centered about the set speed is fed to the transistor 102 where it is amplified and fed to the solenoid coil 104. For example, if the desired cruising speed is 50 miles per hour and the physical size of the light source 48 and the photocell 50 are such as to cover a 5 mile per hour range, the solenoid coil 104 will be constantly energized should the vehicle speed drop below approximately 48 miles per hour and constantly deenergized should the vehicle speed increase above 52 miles per hour. In between these speeds, the solenoid coil 104 is energized for a period of time depending upon the difference between the actual vehicle speed and the desired cruising speed. At 50 miles per hour, the solenoid coil is energized and deenergized for equal periods of time. The valve armature 138 dwells alternately on the vacuum and atmospheric ports 140 and 142 respectively for time intervals depending on the duration of the square wave output from the transistor 102. Consequently, the vacuum in the chamber 134 is modulated to maintain the vehicle at the desired cruising speed and provide a highly stable system which smoothly responds to road conditions which tend to increase or decrease the desired cruising speeds.

While the invention has been described with regards to the preferred embodiments thereof, modifications and variations will now occur to those skilled in the art. For a definition of the invention, reference is made to the appended claims.

We claim:
1. A speed control system for a motor vehicle comprising in combination photoelectric speed transducer means for developing a D-C output signal proportional to the difference between a desired vehicle speed and actual vehicle speed over a fixed speed range below and above said desired speed, said speed transducer including a rotatable element movable through an angle indicative of the actual speed of said vehicle, a light sensitive element, a source of light for illuminating said light sensitive element, carrier means rotatably supported about the axis of said rotatable element and supporting said light sensitive element and said light source in fixed space relationship for angularly positioned said light sensitive element and said source at said desired speed, a disc shaped shutter element having a cut out portion extending over a predetermined segment of the disc and means coupling said shutter element to said rotatable element for movement between said source and said light sensitive element whereby the amount of light falling on said light sensitive element varies from a maximum when said actual speed is below said desired speed by said speed range to a minimum when said actual speed is above said desired speed by said speed range, said speed range being determined by the size of said light sensitive element, multivibrator means responsive to the output of said speed transducer for developing a variable duty cycle pulsating output signal having a pulse duration proportional to said D-C signal, vehicle engine speed control means responsive to said pulsating output signal for maintaining the actual speed of said vehicle at said desired speed.

2. A speed control system for a motor vehicle comprising in combination, photoelectric speed transducer means comprising a shutter mounted for rotation about a fixed axis in accordance with actual vehicle speed, a photocell, a light source, means for angularly positioning said photocell and said light source about said axis to a position related to a desired vehicle speed, said shutter being movable between said photocell and said light source to control the light impinging upon said photocell, said photocell being fully exposed to said light source when the actual speed of said vehicle is less than said desired speed by a predetermined amount, said shutter completely blocking any light to said photocell when the actual speed of said vehicle is greater than said desired speed by a predetermined amount, multivibrator means for developing a variable duty cycle pulsating output signal having a pulse duration related to the amount of light impinging on said photocell, means connecting said light source between a source of voltage and a reference potential, said multivibrator means including first and second transistors each having emitter, base and collector electrodes, the emitter electrodes being coupled together, resistor means connecting the coupled emitter electrodes to said reference potential, resistor means connecting the collector electrodes of each of said transistors to said source of voltage, a capacitor connecting the base electrode of said second transistor to the collector electrode of said first transistor, resistor means connected to the base of said second transistor for normally biasing said second transistor into its linear range of operation, resistor means connecting said photocell between said source and the base electrode of said first transistor, whereby said second transistor is conducting and said first transistor is cut off when said photocell is fully illuminated by said light source and the interval of time in which said second transistor conducts is progressively decreased as said shutter progressively blocks the light impinging upon said photocell, said second transistor being cut off and said first transistor conducting when said shutter completely blocks the light to said photocell, a third transistor for amplifying the output signal of said multivibrator and including emitter, base and collector electrodes, said base electrode being connected with the collector electrode of said second transistor, vehicle engine speed control means adapted to be connected across said source of voltage in series with the emitter and collector electrodes of said third transistor to control the actual speed of said vehicle in accordance with said pulsating output signal.

References Cited

UNITED STATES PATENTS

| 3,028,939 | 4/1962 | Glick | 180—110 X |
| 3,207,255 | 9/1965 | Hahlganss et al. | 180—109 X |
| 3,291,246 | 12/1966 | Colling et al. | 180—109 |
| 3,332,406 | 7/1967 | Perry et al. | 180—105 X |

A. HARRY LEVY, *Primary Examiner.*